United States Patent
Kim et al.

(10) Patent No.: US 7,037,985 B2
(45) Date of Patent: May 2, 2006

(54) URETHANE SPORTING EQUIPMENT COMPOSITION INCORPORATING NITROSO COMPOUND

(75) Inventors: Hyun Jin Kim, Carlsbad, CA (US); Hong Guk Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 10/424,567

(22) Filed: Apr. 24, 2003

(65) Prior Publication Data

US 2004/0214964 A1  Oct. 28, 2004

(51) Int. Cl.
*A63B 37/12* (2006.01)
*A63B 37/00* (2006.01)
*C08L 75/04* (2006.01)

(52) U.S. Cl. ............... 525/457; 528/45; 473/354; 473/365; 473/374; 473/377; 473/378

(58) Field of Classification Search ............... 528/45; 525/457; 473/354, 365, 374, 377
See application file for complete search history.

(56) References Cited

U.S. PATENT DOCUMENTS

| | | | |
|---|---|---|---|
| 4,203,884 A | 5/1980 | Coran et al. | 260/33.6 |
| 4,271,049 A | 6/1981 | Coran et al. | 260/4 R |
| 4,339,506 A | 7/1982 | Martin, Jr. | 428/519 |
| 4,362,840 A | 12/1982 | Tabar et al. | 524/525 |
| 4,384,079 A | 5/1983 | Lemieux et al. | 525/329.3 |
| 5,334,673 A | 8/1994 | Wu | 273/235 R |
| 5,759,676 A | 6/1998 | Cavallaro et al. | 428/215 |
| 5,792,008 A * | 8/1998 | Kakiuchi et al. | 473/354 |
| 5,908,358 A | 6/1999 | Wu | 473/378 |
| 6,037,419 A | 3/2000 | Takesue et al. | 525/329.9 |
| 6,123,628 A | 9/2000 | Ichikawa et al. | 473/371 |
| 6,132,324 A | 10/2000 | Hebert et al. | 473/378 |
| 6,319,152 B1 | 11/2001 | Takesue et al. | 473/371 |
| 6,435,987 B1 | 8/2002 | Dewanjee | 473/378 |
| 2004/0132899 A1* | 7/2004 | Sullivan et al. | 524/590 |

OTHER PUBLICATIONS

Grant & Hackh's Chemical Dictionary, fifth edition, 1990, pp. 294,397,416,576.*

* cited by examiner

*Primary Examiner*—David J. Buttner
(74) *Attorney, Agent, or Firm*—Sheppard, Mullin, Richter & Hampton LLP

(57) ABSTRACT

Sports equipment incorporate thermoplastic compositions including urethane and a nitroso reaction product of a nitroso compound and a diisocyanate or polyisocyanate. The invention allows for the processing advantages of a thermoplastic urethane with the superior performance characteristics of a cross-linked polyurethane.

39 Claims, 1 Drawing Sheet

URETHANE SPORTING EQUIPMENT COMPOSITION INCORPORATING NITROSO COMPOUND

BACKGROUND OF THE INVENTION

1. Field of the Invention

The present invention relates to compositions incorporating urethane for use in sporting equipment. In particular, the invention relates to such compositions for use in golf ball cores, inner covers, outer covers, and intermediate layers. The present invention also relates to methods of manufacture of these compositions.

2. Description of Related Art

Sports equipment often incorporates polymeric materials. These materials are chosen because they provide good properties with respect to cost, weight, and durability in a variety of uses. In particular, polymers are used in the manufacture of golf balls. Golf balls generally include a core and at least one cover layer surrounding the core. Balls can be classified as two-piece, multi-layer, or wound balls. Two-piece balls include a spherical inner core and an outer cover layer. Multi-layer balls include a core, a cover layer and one or more intermediate (or mantle) layers. The intermediate layers themselves may include multiple layers. Wound balls include a core, a rubber thread wound under tension around the core to a desired diameter, and a cover layer, typically of balata material.

Material characteristics of the compositions used in sports equipment, including golf ball layers are important in determining the durability and performance of the equipment. For example, with respect to golf balls, the composition of a golf ball cover layer is important in determining the ball's durability, scuff resistance, speed, shear resistance, spin rate, feel, and "click" (the sound made when a golf club head strikes the ball). Various materials having different physical properties are used to make cover layers to create a ball having the most desirable performance possible. For example, many modern cover layers are made using soft or hard ionomer resins, elastomeric resins or blends of these. Ionomeric resins used generally are copolymers of an olefin and the metal salt of an unsaturated carboxylic acid(s), or are ionomeric terpolymers having at least one additional monomer polymerized into its structure. These resins vary in resiliency, flexural modulus, and hardness. Examples of these resins include those marketed under the tradenames SURLYN (E.I. du Pont de Nemours & Company, Wilmington, Del.) and IOTEK (ExxonMobil Corporation, Irving, Tex.).

Elastomeric resins used in golf ball covers include a variety of available thermoplastic or thermoset elastomers. Balata and thermoplastic and thermoset polyurethane are the three most commonly used materials in this category.

Layers other than cover layers also significantly affect performance of a ball. The composition of an intermediate layer is important in determining the ball's spin rate, speed, and durability. The composition and resulting mechanical properties of the core are important in determining the ball's coefficient of restitution (C.O.R.), which affects ball speed and distance when hit. In addition to the performance factors discussed above, processability also is considered when selecting a formulation for a golf ball composition. Good processability allows for ease of manufacture using a variety of methods known for making golf ball layers, while poor processability may lead to avoidance of use of particular materials, even when those materials provide for good mechanical properties. These same considerations of durability and ease of manufacture are relevant for a wide variety of sports equipment.

Various materials having different physical properties are used to make sports equipment having the most desirable performance possible. One material generally cannot optimize all of the important properties for a particular piece of equipment. For golf balls, properties such as feel, speed, spin rate, resilience and durability all are important, but improvement of one of these properties by use of a particular material often may lead to worsening of another. For example, ideally, a golf ball cover should have good feel and controllability, without sacrificing ball speed, distance, or durability. Despite the broad use of copolymeric ionomers in golf balls, their use alone in, for example, a ball cover may be unsatisfactory. A cover providing good durability, controllability, and feel would be difficult to make using only a copolymeric ionomer resin having a high flexural modulus, because the resulting cover, while having good distance and durability, also will have poor feel and low spin rate, leading to reduced controllability of the ball. Also, the use of particular elastomeric resins alone may lead to compositions having unsatisfactory properties, such as poor durability and low ball speed.

Therefore, to improve the properties of sports equipment produced from polymers, the polymer materials discussed above may be blended to produce improved equipment parts. For example, compositions for use in golf balls have involved blending high-modulus copolymeric ionomer with lower-modulus copolymeric ionomer, terpolymeric ionomer, or elastomer. As discussed above, ideally a golf ball cover should provide good feel and controllability, without sacrificing the ball's distance and durability. Therefore, a copolymeric ionomer having a high flexural modulus often is combined in a cover composition with a terpolymeric ionomer or an elastomer having a low flexural modulus. The resulting intermediate-modulus blend possesses a good combination of hardness, spin and durability.

Sports equipment prepared from polymer often is prepared using one of three known methods of manufacture: casting, injection molding, or compression molding. Of the three methods, injection molding generally is preferred, due to the efficiencies gained by its use. Injection molding generally involves using a mold having one or more sets of two mold sections that mate to form a cavity in the shape of the intended part during the molding process. For example, in forming a golf ball layer over a core, the pairs of mold sections are configured to define a spherical cavity in their interior when mated. When used to mold an outer cover layer for a golf ball, the mold sections may be configured so that the inner surfaces that mate to form the spherical cavity include protrusions configured to form dimples on the outer surface of the molded cover layer. The mold sections are connected to openings, or gates, evenly distributed near or around the parting line, of the mold sections through which the material to be molded flows into the cavity. The gates are connected to a runner and a sprue that serve to channel the molding material through the gates. When used to mold a layer onto an existing structure, such as a ball core, the mold includes a number of support pins disposed throughout the mold sections. The support pins are configured to be retractable, moving into and out of the cavity perpendicular to the spherical cavity surface. The support pins maintain the position of the core while the molten material flows through the gates into the cavity between the core and the mold sections. The mold itself may be a cold mold or a heated mold. In the case of a heated mold, thermal energy is applied to the material in the mold so that a chemical reaction may take place in the material.

Because thermoset materials have desirable mechanical properties, use of such materials in sports equipment generally is desirable. Unfortunately, thermoset materials generally are not well suited for injection molding, because as the reactants for thermoset polyurethane are mixed, they begin to cure and become highly viscous while traveling through the sprue and into the runners of the injection mold, leading to injection difficulties. For this reason, thermoset materials typically are formed into sports equipment using a casting process free of any injection molding steps.

In contrast to injection molding, which generally is used to prepare layers from thermoplastic materials, casting often is used to prepare parts from thermoset material (i.e., materials that cure irreversibly). In an example casting process for making a golf ball layer over a core, the thermoset material is added directly to the mold sections immediately after it is created. Then, the material is allowed to partially cure to a gelatinous state, so that it will support the weight of a core. Once cured to this state, the core is positioned in one of the mold sections, and the two mold sections are then mated. The material then cures to completion, forming a layer around the core. The timing of the positioning of the core is crucial for forming a layer having uniform thickness. The equipment used for this positioning are costly, because the core must be centered in the material in its gelatinous state, and at least one of the mold sections, after having material positioned therein, must be turned over and positioned onto its corresponding mold section. Casting processes often lead to air pockets and voids in the layer being formed, resulting in a high incidence of rejected golf balls. The cost of rejected parts, complex equipment, and the exacting nature of the process combine to make casting a costly process in relation to injection molding.

Compression molding also is used for making parts for use in sports equipment, and it often is combined with injection molding. For example, compression molding of a golf ball layer typically requires the initial step of making half shells by injection molding the layer material into a cold injection mold. The half shells then are positioned in a compression mold, whereupon heat and pressure are used to mold the desired part. Compression molding also may be used as a curing step after injection molding. In such a process, thermally curable material is injection molded around in a cold mold to create a part. After the material solidifies, the part is removed and placed into a mold, in which heat and pressure are applied to induce curing in the part.

As mentioned above, one material used in sports equipment is polyurethane. Polyurethane typically is formed as the reaction product of a diol or polyol, along with an isocyanate. The reaction also may incorporate a chain extender configured to harden the polyurethane formed by the reaction. Thermoplastic polyurethanes have generally linear molecular structures and incorporate physical cross-linking that may be reversibly broken at elevated temperatures. As a result, thermoplastic polyurethanes may be made to flow readily, as is required for injection molding processes. In contrast, thermoset polyurethanes have generally networked structure that incorporate irreversible chemical cross-linking. As a result, thermoset polyurethanes do not flow freely, even when heated.

Thermoplastic and thermoset polyurethanes both have been used in, for example, golf ball layers, and each provides for certain advantages. Because of their excellent flowability, thermoplastic polyurethanes may be positioned readily around a golf ball core using injection molding. Unfortunately, parts comprising thermoplastic polyurethane exhibit poor durability; for example, golf balls from thermoplastic polyurethane exhibit poor shear-cut resistance. Thus, while thermoplastic polyurethane parts are less expensive to make due to their superior processability, they are not favored due to the resulting inferior performance. In contrast, thermoset polyurethane exhibits high shear-cut resistance and is much more scuff- and cut-resistant than thermoplastic polyurethane. However, the irreversible cross-links in the thermoset polyurethane structure make it unsuitable for use in injection molding processes conventionally used for thermoplastic materials.

Thermoplastic polyurethanes are used in sports equipment. Examples of their use in golf ball compositions are discussed in U.S. Pat. No. 5,759,676 to Wu, which discloses thermoplastic polyurethane utilized in blends for mantle and cover layers, and in U.S. Pat. No. 6,319,152 to Takesue, which teaches blending of a thermoplastic polyurethane with a styrene-based block copolymer to increase the scuff resistance of the resulting golf ball cover. The Takesue patent discloses that because thermoplastic polyurethanes are "inexpensive and easy to mold, these elastomers are regarded as an excellent cover stock substitute for balata material. However, the thermoplastic polyurethane elastomers are still insufficient in scuff resistance upon iron shots." Thermoplastic polyurethanes also are used for making mantle layers to give the feel of a wound ball to non-wound constructions. Such a mantle is disclosed in U.S. Pat. No. 5,759,676 to Cavallaro et al.

Though they are more expensive to process than thermoplastic polyurethanes, thermoset polyurethanes also have been used in golf ball layers. For example, U.S. Pat. No. 6,132,324 to Hubert discloses a golf ball having a cover formed from thermoset polyurethane. The patent teaches a method for casting a thermoset polyurethane cover over an ionomer inner layer, including a step of measuring the viscosity "over time, so that the subsequent steps of filling each mold half, introducing the core into one half and closing the mold may be properly timed for accomplishing centering of the core cover halves fusion and overall uniformity." The additional steps involved in casting a layer over those needed for injection molding the layer lead to added complexity and expense. Another patent discussing use of thermoset polyurethane is U.S. Pat. No. 6,435,987 to Dewanjee. This patent teaches thermosetting polyurethane comprising a toluene diisocyanate-based prepolymer, a second diisocyanate prepolymer, and a curing agent. Again, this method makes use of casting because the materials used would not be well suited to injection molding. One attempt to successfully use thermoplastic polyurethane in golf ball covers is disclosed in U.S. Pat. No. 6,123,628 to Ichikawa et al. This patent discloses golf ball covers incorporating the reaction product of a thermoplastic polyurethane with an isocyanate compound. In this patent, the cross-linking reaction is completed during extrusion. The completed golf ball covers are thermoplastic, and they provide for improved scuff resistance, though they do not exhibit improvements in other mechanical properties.

In view of the above, it is apparent that polymer parts for sports equipment that provide optimal performance and durability properties, while demonstrating ease of manufacture, as well as methods for making these parts, are needed. The present invention fulfills this need and provides further related advantages.

SUMMARY OF THE INVENTION

The present invention resides in sports equipment incorporating a composition, in which the composition incorporates the reaction product of: (a) (1) a urethane, or (2) a mixture incorporating diol, polyol, or mixtures of these, along with diisocyanate, polyisocyanate or a mixtures of these, or a mixture of (1) and (2); and (b) a "nitroso reaction product" that is formed as a reaction product of a nitroso compound and a diisocyanate or a polyisocyanate. This nitroso reaction product is characterized by a characteristic temperature $(T_d)$ at which it decomposes to generate the nitroso compound and diisocyanate or polyisocyanate. The nitroso compound preferably incorporates nitrosoamine, nitrosophenol, or mixtures of these. Preferred embodiments of the composition also incorporate a chain extender that preferably incorporates a diol, polyol, diisocyanate, polyisocyanate, diamine, polyamine, or mixtures of these. The polyol of the thermoplastic polyurethane preferably incorporates a polyester polyol, a polycarbonate polyol, a polyether polyol, a polybutadiene polyol, or mixtures of these. The composition also may incorporate organic peroxide, plasticizer, UV stabilizers, photostabilizers, antioxidants, colorants, dispersants, mold releasing agents, processing aids, or fillers. The compositions may incorporate other polymers in addition to those described above.

Preferably, the ratio in the composition by combined weight of urethane, diol, polyol, diisocyanate, and polyisocyanate to weight of nitroso reaction product ranges between 99.9:0.1 and about 60:40, more preferably 99:1 and about 70:30, more preferably about 98:2 and about 80:20, and most preferably about 97.5:2.5 and about 90:10. The urethane preferably is an ether-type or ester-type polyurethane, or a mixture of these. In a preferred embodiment of the invention, the urethane (1) or the mixture (2) above is substantially free of unsaturated hydrocarbons.

A preferred article of sports equipment within the scope of the present invention includes a golf ball incorporating the composition. The cover layer, intermediate layers, or core of the ball may incorporate the composition. These balls may include, for example, an inner core and one or more outer cores, liquid cores, or wound thread layers between the core and cover.

The present invention also resides in a method for preparing a portion of sports equipment incorporating the steps of: 1) preparing a composition such as that described above; 2) forming the composition into the portion; and 3) inducing cross-linking or polymerization in the composition by adding thermal energy to the composition, so that a temperature of the composition is greater than the characteristic temperature $(T_d)$ of the nitroso reaction product, to create a cross-linked polyurethane. The step of forming the composition into the portion may include, for example, injection molding the composition to form the portion. The step of preparing a composition may include, for example, dry-blending the composition, optionally with at least one additional polymer. The step of preparing the composition may include mixing the composition using a mill, internal mixer or extruder.

Preferred aspects of the method include premixing the nitroso reaction product with at least one additional polymer to create a concentrate, and then introducing the concentrate into the mixture of the composition discussed above and additional polymer. Preparing the composition also may include forming pellets from the thermoplastic urethane coating the pellets with the nitroso reaction product. The steps of preparing a composition and forming the composition into a portion preferably take place under conditions of temperature and pressure such that substantially no cross-linking occurs in the composition.

In one particular aspect of the method for which the sports equipment is a golf ball incorporating a core and at least one layer, the step of forming the portion incorporates forming the composition into half cups; and positioning the half cups over the inner core, such that the inner core is covered by the half cups to form the layer or layers. Another aspect of the method configured for molding a golf ball layer over an inner core of a golf ball includes: 1) preparing a composition as described above; 2) forming the composition into half cups; 3) coating the half cups with a nitroso reaction product as described above; 4) positioning the half cups over the inner core such that the inner core is covered by the half cups; and 5) inducing cross-linking or polymerization in the composition by increasing thermal energy to and pressure on the half cups, so that a temperature of the composition is greater than the characteristic temperature $(T_d)$ of the nitroso reaction product, resulting in the half cups being bonded together to form a layer. Aspects of this method also may include other methods of forming the layer and coating the layer with the nitroso reaction product.

Another preferred aspect of the method for preparing a golf ball layer incorporates preparing a final reaction product of (a) a diol or polyol, (b) a diisocyanate or polyisocyanate, and (c) a nitroso reaction product formed as a reaction product of a nitroso compound as described above, and inducing cross-linking in the final reaction product by adding thermal energy to the final reaction product, so that a temperature of the final reaction product is greater than a characteristic temperature $(T_d)$ of the nitroso reaction product, to create a cross-linked polyurethane. The method may be performed using a reaction injection molding technique, or a casting process. An additional aspect of the method configured for preparing a golf ball layer incorporates the steps of 1) preparing a final reaction product of: (a) a urethane prepolymer or a mixture comprising a diisocyanate or polyisocyanate and diol or polyol, and (b) a curing agent incorporating a nitroso reaction product as described above, or a mixture of the nitroso reaction product and a constituent selected from diol, polyol, diisocyanate, polyisocyanate, diamine, polyamine, or mixtures of these; and 2) inducing cross-linking in the final reaction product by adding thermal energy to the final reaction product, such that a temperature of the final reaction product is greater than characteristic temperature $(T_d)$ of the nitroso reaction product, to create a cross-linked polyurethane. The method may be performed using a reaction injection molding technique, or a casting process.

Other features and advantages of the present invention should become apparent from the following detailed description of the preferred embodiments.

DETAILED DESCRIPTION OF THE PREFERRED EMBODIMENTS

Figure 1:
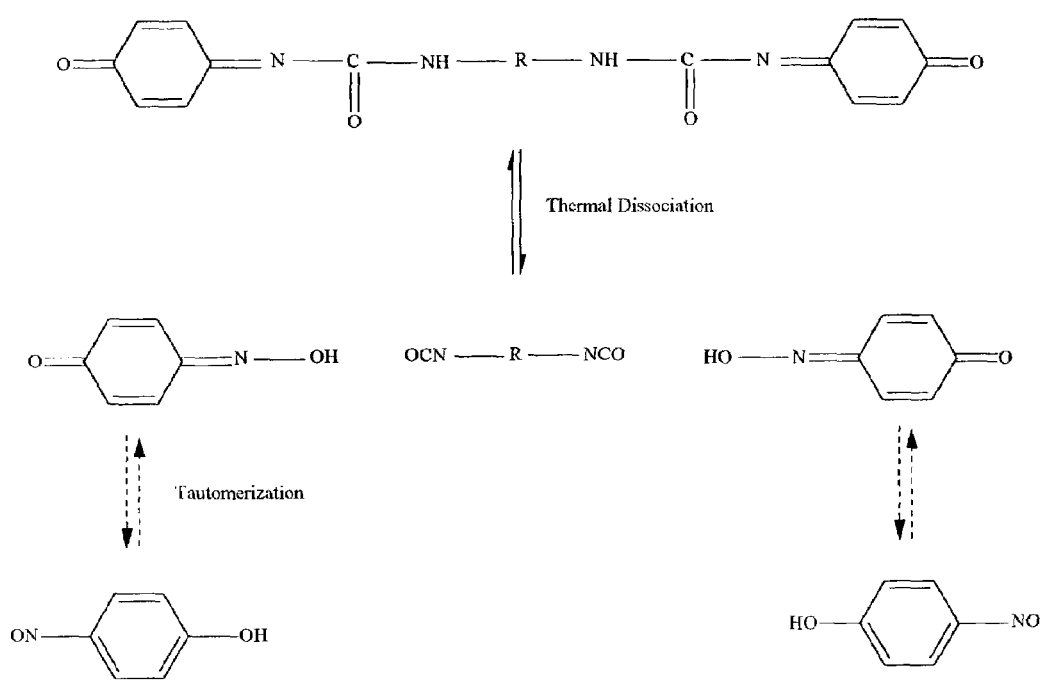
FIG. 1 is a general representation of the formation and dissociation of a nitroso reaction product for use in the present invention.

The present invention is embodied in sports equipment, such as golf balls, skis, ski boots, in-line skates, surfboards and athletic shoes, incorporating a composition that includes the reaction product of: 1) urethane or its diol/polyol and polyisocyanate precursors with 2) a "nitroso reaction product," defined as the reaction product of a nitroso compound and a diisocyanate or a polyisocyanate. The nitroso reaction product may serve as a chain extender or cross-linking agent in the composition. Alternatively, the compositions of the present invention may incorporate urethane prepolymer as a precursor to polyurethane. In particular, the present invention is embodied in golf ball covers, intermediate layers, and cores incorporating the above specified composition, and it additionally resides in methods of manufacture of sports equipment, such as golf balls, incorporating these compositions. The combination of the thermoplastic urethane and nitroso reaction product allows for formation of urethane sports equipment parts that are easily processable and, upon exposure to sufficient heat and/or pressure, become cross-linked polyurethane, providing for superior performance. These compositions are easy to use, and they provide flexibility in part to improve performance, without adversely affecting the durability and cut resistance of the parts. The compositions also allow for salvage for later use of scrap material that has not been fully cross-linked.

Nitroso compounds used in the nitroso reaction compounds incorporate the fimelional group —N=O bonded to a carbon atom. Examples of particularly preferred nitroso reaction products used in the compositions of the present invention are adducts of a nitrosophenol or a nitrosoamine with a di- or polyisocyanate. The structure of these may be exemplified by the following:

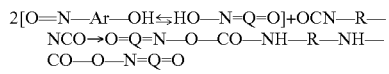

in which R may be any organic group, Ar is an aromatic group, and Q is the aromatic group in its quinonoid form. These nitroso reaction products decompose at a characteristic temperature ($T_d$) to generate the nitrosopbenol or nitrosoamine and isocyanate constituents. Each nitroso reaction product may have a characteristic decomposition temperature ($T_d$) at which the adduct decomposes, and the resultant nitrosophenol or nitrosoamine units react with the urethane. FIG. 1 provides a general representation of this decomposition. The nitroso reaction products may be used alone as cross-linking agents, or alternatively other cross-linking agents also may be used in the composition. The compositions also may incorporate additional chain extenders.

Before the composition of the present invention is exposed to sufficient thermal energy to reach the $T_d$ of the nitroso reaction product, it behaves as a thermoplastic material. Therefore, it may readily be formed as necessary for incorporation into sports equipment, such as into golf balls, using conventional injection molding. However, when sufficient thermal energy is applied to bring the composition above the $T_d$, the thermoplastic urethane is converted into cross-linked polyurethane.

As discussed above, the compositions of the present invention incorporate at least one nitroso reaction product as a cross-linking agent or chain extender. The nitroso reaction product should be selected to prevent a significant amount of premature cross-linking during, for example, injection molding or blending of the composition. Often, during processing of the composition, the temperature of the composition is raised to increase its fluidity. In the case of the present invention, the processing temperature of the composition generally will be raised above the characteristic $T_d$ temperature of the nitroso reaction product. However, the composition is processed quickly at these temperatures and is cooled (either actively or passively) before substantial cross-linking may occur.

Once the composition is formed into the required part, such as a golf ball layer, additional thermal energy then may be added to raise the temperature well above $T_d$ and induce further cross-linking. The degree of cross-linking of the compositions within the scope of the present invention includes either partial or full chemical cross-linking. The cross-link density (i.e., the degree of cross-linking) may be adjusted by varying the amount or type of nitroso reaction product in the composition. The cross-link density also may be controlled by the temperature to which the composition is brought during processing, as well as by the characteristic $T_d$ temperature of the nitroso reaction product. Preferably, the ratio by weight of the thermoplastic polyurethane or its precursors to the nitroso reaction product ranges between 99.9:0.1 and about 60:40, more preferably between 99:1 and about 70:30, even more preferably between about 98:2 and about 80:20, and most preferably between about 97.5:2.5 and about 90:10. An example of one of these nitroso reaction products is disclosed in, for example, U.S. Pat. No. 4,384,079 to Lemieuw et al., which discloses reaction products of nitrosophenol and diisocyanate. _Examples of suitable nitroso reaction products include those marketed under the trade name NOVOR by Akrochem, Inc., such as Novor 950. These marketed products may not, however provide the same level of performance and processing ease as that provided by nitroso reaction products prepared as in, for example the Lemieuw patent.

Non-limiting examples of urethanes suitable for use in the compositions of the present invention include thermoplastic polyurethanes, including ether- and ester-type polyurethanes, such as those marketed under the trade name ESTANE by Noveon, Inc.

Polyols suitable for use in the compositions of the present invention include polyester polyols, polyether polyols, polycarbonate polyols and polybutadiene polyols.

Isocyanates suitable for use in the compositions of the present invention include: trimethylene diisocyanate, tetramethylene diisocyanate, pentamethylene diisocyanate, hexamethylene diisocyanate, ethylene diisocyanate, diethylidene diisocyanate, propylene diisocyanate, butylenes diisocyanate, bitolylene diisocyanate, tolidine isocyanate, isophorone diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis (phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl) cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'- biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4"-triisocyanate, dichlorohexamethylene diisocyanate, ù, ù'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination.

Sports equipment compositions within the scope of the present invention also may incorporate chain extenders other than the nitroso reaction products of the present invention. Non-limiting examples of these extenders include polyols, polyamine compounds, and mixtures of these. Polyol extenders may be primary, secondary, or tertiary polyols. Specific examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Diamines also may be added to the compositions of the present invention to function as chain extenders. Suitable diamines include: tetramethylenediamine, pentamethylenediamine, hexamethylenediamine, p,p'-methylenedianiline, p-phenylenediamine and others. Aromatic diamines have a tendency to provide a stiffer (i.e., having a higher Mooney viscosity) product than aliphatic or cycloaliphatic diamines. Suitable polyamines that may be used as chain extenders include primary, secondary and tertiary amines; polyamines have two or more amines as functional groups. Examples of these include: aliphatic diamines, such as hexamethylene diamine; alicyclic diamines, such as 3,3'-dimethyl-4,4'-diamino-dicyclohexyl methane; or aromatic diamines, such as 4,4'-methylene bis-2-chloroaniline, 2,2',3,3'-tetrachloro-4,4'-diaminophenyl methane or 4,4'-diaminodiphenyl; and 2,4,6-tris(dimethylaminomethyl) phenol. These chain extenders may be used either alone or in combination.

As discussed above, the urethane compositions of the present invention can incorporate urethane prepolymer. Diol/polyol and/or amine/polyamine may be reacted with urethane prepolymer as a precursor for polyurethane, as a chain extender or as a cross-linking agent.

Compositions within the scope of the present invention also may incorporate organic peroxides, in addition to the nitroso compounds. The organic peroxides provide additional cross-linking in the composition. Examples of suitable peroxides for use in compositions within the scope of the present invention include aliphatic peroxides, aromatic peroxides, cyclic peroxides, or mixtures of these. Primary, secondary, or tertiary peroxides may be used, with tertiary peroxides preferred.

In addition to the materials discussed above, compositions within the scope of the present invention may incorporate one or more polymers in addition to the urethane or precursors and nitroso reaction product of the present invention. These additional polymers may be added as need for a desired effect, such as softening an otherwise overly hard cover composition. Examples of suitable additional polymers for use in the present invention include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrylonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Particularly suitable plasticizers for use in the compositions within the scope of the present invention include: polyethylene terephthalate, polybutylene terephthalate, polytrimethylene terephthalate, ethylene-carbon monoxide copolymer, polyvinylidiene fluorides, polyphenylenesulfide, polypropylene oxide, polypropylene, functionalized polypropylene, polyethylene, ethylene-octene copolymer, ethylene-methyl acrylate (EMA), ethylene-butyl acrylate (EBA), polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene (SBS) or styrene-isoprene-styrene block copolymers such as styrene-(ethylene-propylene)-styrene (SEPS) or styrene-(ethylene-butadiene)-styrene (SEBS) block copolymers, partially or fully hydrogenated styrene-butadiene-styrene block copolymers with functional group, polymers based on ethylene-propylene-diene monomer (EPDM), polymers based on functionalized EPDM, dynamically vulcanized polypropylene/EPDM copolymer, thermoplastic vulcanizates based on polypropylene or EPDM, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, polyester rubber, epichlorohydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene.

Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as å-caprolactam or ù-laurolactam; (3) polycondensation of an aminocarboxylic acid, such as 6-aminocaproic acid, 9-aminononaoic acid, 11-aminoundecanoic acid or 12-aminododecanoic acid; or, (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other preferred materials suitable for use as an additional material in compositions within the scope of the present invention include polyester elastomers marketed under the tradename SKYPEL by SK Chemicals of South Korea, or triblock copolymers marketed under the tradename SEPTON by Kuraray Corporation of Kurashiki, Japan. All of the materials listed above may provide for particular enhancements to ball layers prepared within the scope of the present invention.

As mentioned above, ionomeric polymers often are found in sports equipment compositions. These ionomers also are well suited for blending into compositions within the scope of the present invention. Suitable ionomeric polymers (i.e., copolymer- or terpolymer-type ionomers) include á-olefin/unsaturated carboxylic acid copolymer-type ionomeric or terpolymer-type ionomeric resins that may be described as copolymer E/X/Y, where E represents ethylene, X represents a softening co-monomer such as acrylate or methacrylate, and Y is acrylic or methacrylic acid. The acid moiety of Y is neutralized to form an ionomer by a cation such as lithium, sodium, potassium, magnesium, calcium, barium, lead, tin, zinc or aluminum. Also, a combination of such cations is used for the neutralization. Copolymeric ionomers are obtained by neutralizing at least portion of carboxylic groups in a copolymer of an á-olefin and an á,â-unsaturated carboxylic acid having 3 to 8 carbon atoms, with a metal ion. Examples of suitable á-olefins include ethylene, propylene, 1-butene, and 1-hexene. Examples of suitable unsaturated carboxylic acids include acrylic, methacrylic, ethacrylic, á-chloroacrylic, crotonic, maleic, fumaric, and itaconic acid. Copolymeric ionomers include ionomers having varied acid contents and degrees of acid neutralization, neutralized by monovalent or bivalent cations discussed above.

Terpolymeric ionomers are obtained by neutralizing at least portion of carboxylic groups in a terpolymer of an á-olefin, and an á,â-unsaturated carboxylic acid having 3 to 8 carbon atoms and an á,â-unsaturated carboxylate having 2 to 22 carbon atoms with metal ion. Examples of suitable á-olefins include ethylene, propylene, 1-butene, and 1-hexene. Examples of suitable unsaturated carboxylic acids include acrylic, methacrylic, ethacrylic, á-chloroacrylic, crotonic, maleic, fumaric, and itaconic acid. Terpolymeric ionomers include ionomers having varied acid contents and degrees of acid neutralization, neutralized by monovalent or bivalent cations discussed above. Examples of suitable ionomeric resins include those marketed under the name SURLYN manufactured by E. I. du Pont de Nemours & Company of Wilmington, Del., and IOTEK manufactured by Exxon Mobil Corporation of Irving, Tex.

Silicone materials also are well suited for blending into compositions within the scope of the present invention. These may be monomers, oligomers, prepolymers, or polymers, with or without additional reinforcing filler. One type of silicone material that is suitable may incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality may be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl; and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlysiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and, the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, N.Y., and Elastosil by Wacker Silicones of Adrian, Mich.

Other types of copolymers also may be added to compositions within the scope of the present invention. Examples of copolymers comprising epoxy monomers and which are suitable for use within the scope of the present invention include styrene-butadiene-styrene block copolymers, in which the polybutadiene block contains epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Compositions within the scope of the present invention also may include, in suitable amounts, one or more additional ingredients generally employed in polymer compositions. Agents provided to achieve specific functions, such as additives and stabilizers, may be present. Suitable ingredients include colorants, UV stabilizers, photo stabilizers, antioxidants, colorants, dispersants, mold releasing agents, processing aids and fillers. The compositions may incorporate, for example, inorganic fillers, such as titanium dioxide, calcium carbonate, zinc sulfide or zinc oxide. Additional fillers may be chosen to impart additional density to the compositions, such as zinc oxide, barium sulfate, tungsten or any other metallic powder having density higher than that of the base polymeric resin. Any organic or inorganic fibers, either continuous or non-continuous, also may be in the composition. An example of these is silica-containing filler, which preferably is selected from finely divided, heat-stable minerals, such as fumed and precipitated forms of silica, silica aerogels and titanium dioxide having a specific surface area of at least about 10 $m^2$/gram.

The urethane, as for example thermoplastic polyurethane or urethane prepolymer and the nitroso reaction product (or its nitroso compound and diisocyanate/polyisocyanate precursors) may be mixed together to form the composition of the present invention, with or without melting them. Dry blending equipment, such as a tumbler mixer, V-blender, or ribbon blender, may be used to mix the compositions. The nitroso reaction product or its precursors may be mixed together with thermoplastic urethane, urethane prepolymer, or urethane precursors. The nitroso reaction product or its precursors also may be added after addition of any of the additional materials discussed above. Materials may be added to the composition using a mill, internal mixer, extruder or combinations of these, with or without application of thermal energy to produce melting. In another method of manufacture of these compositions, the nitroso reaction product or its precursors may be premixed with the thermoplastic urethane and additional materials to produce a concentrate having a high concentration of nitroso reaction product or its precursors. Then, this concentrate may be introduced into a composition of thermoplastic urethane and additional materials using dry blending or melt mixing. The additional materials also may be added to a color concentrate, which is then added to the composition to impart a preferred color to the equipment part. Instead of melt mixing, the nitroso reaction product or its precursors may be applied to the mixture of thermoplastic urethane by using methods such as dipping or spraying of the nitroso reaction product or its precursors onto parts made from thermoplastic urethane, so that the thermoplastic urethane is coated with the nitroso reaction product or its precursors. This is particularly useful when the part formed is relatively thin, so that a surface application of the nitroso compound allows for cross-linking to take place throughout the part. In another method, thermoplastic urethane may be extruded, with or without any of the additional materials discussed above. Then, pellets of this thermoplastic urethane composition formed from this extrusion are sprayed with the nitroso reaction product or its precursors prior to molding. Any combination of the above-mentioned mixing methods may be used to produce a final part of sports equipment within the scope of the present invention.

Preferred illustrative examples of manufacture of sports equipment within the scope of the present invention are provided for golf balls. A preferred method within the scope of the present invention involves injection molding a core, intermediate layer, or cover of the composition into a cold mold without inducing heavy cross-linking. The product from this process then is compression-molded to induce partial or full cross-linking by use of thermal energy. In another preferred method, injection molding is used to inject the composition around a core positioned in a mold, in which thermal energy is applied to induce cross-linking. In yet another preferred method, an intermediate layer or a cover of the composition may be prepared by injection molding half-shells. The half shells are then positioned around a core and compression molded. The heat and pressure first melt the composition to seal the two half shells together to form a complete layer. Additional thermal energy induces cross-linking of the thermoplastic urethane. In another preferred method, half shells of the composition prior to addition of the nitroso reaction product or its precursors are prepared. The half shells are coated with nitroso reaction product or its precursors and compression molded around a core to form a layer and induce cross-linking. In another preferred method, a layer of the composition prior to addition of nitroso reaction product or its precursors is positioned around a core to form a layer. The layer then is coated with nitroso reaction product or its precursors and compression molded to induce cross-linking.

In additional preferred methods of manufacture, known casting processes may be used. For example, a preferred method within the scope of the present invention incorporates preparing a urethane prepolymer as discussed above, and using it in a casting process. The prepolymer and the nitroso reaction product or its precursors are mixed together, placed in a cast, and then heated to a temperature above the characteristic temperature of the nitroso reaction product, to form a layer of cross-linked polyurethane. Alternatively, polyols, isocyanate, and nitroso reaction product are introduced into a first mold half and allowed to polymerize and partially cure at a temperature above the characteristic temperature ($T_d$) of the nitroso reaction product. After the core is centered in the first mold half, a second mold half is filled with the same mixture. The first mold half then is inverted and placed over the second mold half to form a complete layer over the core. Then polymerization or cross-linking are completed by heating as described above, so that a complete layer of the cross-linked polyurethane product is produced. Another preferred casting method is to use a reaction injection molding (RIM) technique. In the method, polyol, isocyanate, and nitroso reaction product or its precursors are introduced into a mold from separate tanks at a specified ratio. Then, polymerization or cross-linking reactions occur at a temperature above the characteristic temperature ($T_d$) of the nitroso reaction product.

In addition to the above, when used to form a cover layer, a preferred embodiment of the method involves preparing the cover layer using injection molding and forming dimples on the surface of the cover layer, while inducing full or partial cross-linking of the layer during injection molding. Alternately, the cover layer may be formed using injection molding without dimples, after which the cover layer is compression molded to form dimples and also induce full or partial cross-linking.

EXAMPLES

A series of mechanical tests were conducted on compositions incorporating an ether-type thermoplastic polyurethane and either a nitroso reaction product, or a nitroso reaction product and a peroxide, to demonstrate the effects of cross-linking on mechanical properties. Each of Compositions 1–3 incorporate ESTANE 58144, an ether-type thermoplastic polyurethane, marketed by Noveon Inc. Compositions 2 and 3, within the scope of the present invention, additionally incorporate a nitroso reaction product, specifically NOVOR 950, marketed by Akrochem, Inc., in which R in FIG. 1 is a phenyl group. Composition 3, also within the scope of the present invention, further incorporates a peroxide, specifically Varox 2,5-dimethyl-2,5-di-(tert-butylperoxy)-hexane, marketed by Vanderbilt Company, Inc. The nitroso reaction product and peroxide (if present) were introduced into the polyurethane using dry-blending or extrusion, followed by injection molding to prepare the specimens discussed below. Various tests were performed on these specimens, and the test results are summarized below in Tables 1 and 2. Table 1 presents results of testing for tensile strength, ultimate elongation, flexural modulus and hardness, each measured using ASTM standards D-638, D-790, and D-2240. Table 2 presents results for dynamic storage moduli in $10^7$ Pa at different angular frequencies at a constant temperature of 25° C. These results were obtained using a dynamic mechanical analyzer in oscillatory mode with a torsional rectangular fixture.

TABLE 1

| Comp. No. | Added Materials | Tensile Strength (psi) | Elastic Modulus (ksi) | Ultimate Elongation (%) | Flexural modulus (psi) | Hardness Shore D |
|---|---|---|---|---|---|---|
| 1 | None | 4,762 | 21 | 570 | 31,271 | 60 |
| 2 | 3 wt % nitroso reaction product | 5,568 | 37 | 221 | 60,101 | 66 |
| 3 | 3 wt % nitroso reaction product 0.6% Varox | 5,715 | 31 | 179 | 46,129 | 65 |

TABLE 2

| Frequency (Hz) | Comp. 1 | Comp. 2 | Comp. 3 |
|---|---|---|---|
| 0.1 | 8.67 | 11.2 | 11.4 |
| 1 | 15.0 | 23.9 | 24.2 |
| 50 | 23.5 | 36.7 | 37.4 |

The data in Table 1 illustrate that tensile stress and elastic modulus increased after reaction with the nitroso reaction product, and that ultimate elongation decreased substantially. The specimens changed in character from thermoplastic to thermoset after the cross-linking reactions took place. The data in Table 2 show that the dynamic storage moduli increase with addition of the nitroso reaction product and of the nitroso reaction product and peroxide. This is consistent with the cross-linking indicated by the data in Table 1.

These test results show that compositions within the scope of the present invention may first be easily processed as a thermoplastic material, and then be induced to cross-link using a nitroso reaction product or both a nitroso reaction product and an organic peroxide, to achieve excellent durability. These final properties may be optimized for specific applications in sports equipment by adjusting the type and ratio of urethane or urethane precursors, nitroso reaction product or precursors (nitroso compound and diisocyanate or triisocyanate), and additional materials in the composition. Additionally, the degree of cross-linking in the composition may be adjusted by selection of the processing method and conditions used in making the compositions.

Although the invention has been disclosed in detail with reference only to the preferred embodiments, those skilled in the art will appreciate that additional compositions can be made without departing from the scope of the invention. Accordingly, the invention is defined only by the claims set forth below.

We claim:

1. Sports equipment comprising a thermoset composition, the composition comprising the reaction product of:
   (a) (1) a urethane, or
   (2) a mixture comprising diol or polyol or mixtures thereof, along with diisocyanate or polyisocyanate, or mixtures thereof, or
   (3) a mixture of (1) and (2); and
   (b) a nitroso reaction product formed as a reaction product of a nitroso compound and a diisocyanate or a polyisocyanate,
   wherein the nitroso reaction product is characterized by a characteristic temperature at which it decomposes to generate the nitroso compound and diisocyanate or polyisocyanate, and
   wherein the nitroso reaction product is present in an amount sufficient to render the composition thermoset.

2. Sports equipment as defined in claim 1, wherein the nitroso compound comprises nitrosoamine, nitrosophenol, or mixtures thereof.

3. Sports equipment as defined in claim 1, wherein the composition further comprises at least one chain extender.

4. Sports equipment as defined in claim 3, wherein the at least one chain extender comprises a diol, polyol, diisocyanate, polyisocyanate, diamine, polyanulne, or mixtures thereof.

5. Sports equipment as defined in claim 1, wherein the polyol comprises a polyester polyol, a polycarbonate polyol, a polyether polyol, a polybutadiene polyol, or mixtures thereof.

6. Sports equipment comprising a composition, the composition comprising the reaction product of:
   (a) (1) aurethane, or
   (2) a mixture comprising diol or polyol or mixtures thereof, along with diisocyanate or polyisocyanate, or mixtures thereof; or
   (3) a mixture of (1) and (2); and
   (b) a nitroso reaction product formed as a reaction product of a nitroso compound and a diisocyanate or a polyisocyanate,
   wherein the nitroso reaction product is characterized by a characteristic temperature at which it decomposes to generate the nitroso compound and diisocyanate or polyisocyanate, and wherein the composition further comprises an organic peroxide.

7. Sports equipment as defined in claim 1, wherein the ratio in the composition by combined weight of urethane, diol, polyol, diisocyanate, and polyisocyanate, to weight of nitroso reaction product ranges between 99.9:0.1 and about 60:40.

8. Sports equipment as defined in claim 7, wherein the ratio by combined weight of urethane, diol, polyol, diisocyanate, and polyisocyanate, to weight of nitroso reaction product ranges between 99:1 and about 70:30.

9. Sports equipment as defined in claim 8, wherein the ratio by combined weight of urethane, diol, polyol, diisocyanate, and polyisocyanate, to weight of nitroso reaction product ranges between about 98:2 and about 80:20.

10. Sports equipment as defined in claim 9, wherein the ratio by combined weight of urethane, diol, polyol, diisocyanate, and polyisocyanate, to weight of nitroso reaction product ranges between about 97.5:2.5 and about 90:10.

11. Sports equipment as defined in claim 1, wherein the composition further comprises a plasticizer.

12. Sports equipment as defined in claim 1, wherein the composition comprises UV stabilizers, photo stabilizers, antioxidants, colorants, dispersants, mold releasing agents, processing aids, or fillers.

13. Sports equipment as defined in claim 1, wherein the composition further comprises at least one additional polymer.

14. Sports equipment as defined in claim 1, wherein the urethane comprises ether-type thermoplastic polyurethane, ester-type polyurethane, or mixtures thereof.

15. Sports equipment as defined in claim 1, wherein the sports equipment is a golf ball comprising a core and a cover layer over the core, wherein the core or cover layer comprises the composition.

16. Sports equipment as defined in claim 15, wherein the golf ball further comprises one or more intermediate layers situated between the core and the cover layer, and wherein at least one of the one or more intermediate layers comprising the composition.

17. Sports equipment as defined in claim 15, wherein the core comprises an inner core and one or more outer cores encasing the inner core.

18. Sports equipment as defined in claim 15, wherein the core comprises liquid.

19. Sports equipment as defined in claim 15, further comprising a layer of rubber thread situated between the core and the cover layer of the golf ball.

20. Sports equipment comprising a thermoset composition, the composition comprising the reaction product of:
    (a) (1) a urethane, or
        (2) a mixture comprising diol or polyol or mixtures thereof, along with diisocyanate or polyisocyanate, or mixtures thereof, or
        (3) a mixture of (1) and (2); and
    (b) a nitroso reaction product formed as a reaction product of a nitroso compound and a diisocyanate or a polyisocyanate,
    wherein the nitroso reaction product is characterized by a characteristic temperature at which it decomposes to generate the nitroso compound and diisocyanate or polyisocyanate,
    wherein the urethane or the mixture comprising dial or polyol or mixtures thereof along with diisooyanate or polyisocyanate or mixtures thereof, is substantially free of unsaturated hydrocarbons, and
    wherein the nitroso reaction product is present in an amount Sufficient to render the composition thermoset.

21. Sports equipment as defined in claim 20, wherein the nitroso reaction product comprises nitrosoaniine, nitrosophenol, or mixtures thereof.

22. Sports equipment as defined in claim 20, wherein the composition further comprises at least one chain extender.

23. Sports equipment as defined in claim 22, wherein the at least one chain extender comprises a diol, polyol, diisocyanate, polyisocyanate, diamine, polyamine, or mixtures thereof.

24. Sports equipment as defined in claim 20, wherein the polyol comprises a polyester polyol, a polycarbonate polyol, a polyether polyol, a polybutadiene polyol, or mixtures thereof.

25. Sports equipment as defined in claim 20, wherein the composition further comprises an organic peroxide.

26. Sports equipment as defined in claim 20, wherein the ratio in the composition of combined weight of urethane, diol, polyol, diisocyanate, and polyisocyanate, to weight of nitroso reaction product ranges between about 99.9:0.1 and about 60:40.

27. Sports equipment as defined in claim 20, wherein the ratio by combined weight of urethane, diol, polyol, diisocyanate, and polyisocyanate, to weight of nitroso reaction product ranges between about 99:1 and about 70:30.

28. Sports equipment as defined in claim 20, wherein the ratio by weight of urethane or the mixture comprising diol or polyol or mixtures thereof along with dilsocyanate or polyisocyanate or mixtures thereof to nitroso reaction product ranges between about 98:2 and about 80:20.

29. Sports equipment as defined in claim 20, wherein the ratio by weight of urethane or the mixture comprising diol or polyol or mixtures thereof along with diisocyanale or polyisocyanate or mixtures thereof to nitroso reaction product ranges between about 97.5:2.5 and about 90:10.

30. Sports equipment as defined in claim 20, wherein the composition further comprises a plasticizer.

31. Sports equipment as defined in claim 20, wherein the composition comprises UV stabilizers, photostabilizers, antioxidants, colorants, dispersants, mold releasing agents, processing aids, or fillers.

32. Sports equipment as defined in claim 20, wherein the composition further comprises at least one additional polymer.

33. Sports equipment as defined in claim 20, wherein the urethane comprises ether-type thermoplastic polyurethane, ester-type polyurethane, or mixtures thereof.

34. Sports equipment as defined in claim 20, wherein the sports equipment is a golf ball comprising a core and a cover layer over the core, wherein at least one layer comprises the composition.

35. Sports equipment as defined in claim 34, wherein the cover layer comprises the composition.

36. Sports equipment as defined in claim 34, wherein the golf ball further comprises one or more intermediate layers situated between the care and the cover layer, and wherein at least one of the one or more intermediate layers comprising the composition.

37. Sports equipment as defined in claim 34, wherein the core comprises an inner core and one or more outer cores encasing the inner core.

38. Sports equipment as defined in claim 34, wherein the core comprises liquid.

39. Sports equipment as defined in claim 34, further comprising a layer of rubber thread situated between the core and the cover layer of the golf ball.

\* \* \* \* \*